(12) United States Patent
Kim

(10) Patent No.: US 6,785,949 B2
(45) Date of Patent: Sep. 7, 2004

(54) DEVICE FOR PUTTING POLYETHYLENE CLADDING ON GALVINIZED STEEL PLATE

(75) Inventor: Han Gon Kim, Incheon-Kwangyokshi (KR)

(73) Assignee: Boram Tech Co., Ltd., Kyonggi-Do (KR)

( * ) Notice: Subject to any disclaimer, the term of this patent is extended or adjusted under 35 U.S.C. 154(b) by 43 days.

(21) Appl. No.: 10/321,344

(22) Filed: Dec. 17, 2002

(65) Prior Publication Data
US 2004/0093715 A1 May 20, 2004

(30) Foreign Application Priority Data
Nov. 14, 2002 (KR) ............................. P 10-2002-0070809

(51) Int. Cl.⁷ ................................................ B23P 23/00
(52) U.S. Cl. ...................... 29/564; 29/564.1; 29/564.6; 29/564.7; 29/564.8
(58) Field of Search ............................ 29/564, 564.1, 29/564.6, 564.7, 564.8, 33 R

(56) References Cited

U.S. PATENT DOCUMENTS

| | | | |
|---|---|---|---|
| 4,130,933 A | * 12/1978 | Demrick | 29/564 |
| 4,161,811 A | * 7/1979 | Nyssen | 29/564.1 |
| 4,404,720 A | * 9/1983 | Bohannon, Jr. | 29/564.1 |
| 4,541,164 A | * 9/1985 | Monzon Indave | 29/564.8 |
| 4,657,787 A | * 4/1987 | Singer et al. | 29/527.3 |
| 6,119,344 A | * 9/2000 | Court et al. | 29/897 |
| 6,125,540 A | * 10/2000 | Court et al. | 29/564 |

* cited by examiner

Primary Examiner—A. L. Wellington
Assistant Examiner—Dana Ross
(74) Attorney, Agent, or Firm—Marshall, Gerstein & Borun LLP

(57) ABSTRACT

Device for putting polyethylene cladding on a galvanized steel plate, wherein a galvanized steel plate unroller from unroller is passed through a plate press, an ultrasonic cleaner, a dryer, an intermediate frequency heater, and a roll press in succession, and polyethylene sheets unrolling from one pair of sheet unrollers are welded on opposite sides of the galvanized steel plate, and rolled on a sheet roller, thereby automatically putting polyethylene cladding on the galvanized steel plate, to improve workability and productivity.

3 Claims, 3 Drawing Sheets

DEVICE FOR PUTTING POLYETHYLENE CLADDING ON GALVINIZED STEEL PLATE

This application claims the benefit of the Korean Application No. P2002-70809 filed on Nov. 14, 2002, which is hereby incorporated by reference.

BACKGROUND OF THE INVENTION

1. Field of the Invention

The present invention relates to a device for putting polyethylene cladding on a galvanized steel plate, and more particularly, to a device for putting polyethylene cladding on a galvanized steel plate, in which polyethylene sheets are cladded on front and back surfaces of galvanized steel plate, which is mostly used for fabricating a steel pipe, for enhancing corrosion resistance, and durability.

2. Background of the Related Art

In general, the galvanized steel plate 1, having a zinc layer galvanized both on front and back surfaces of a steel plate, is widely used as a raw material of a steel pipe for sewage disposal because the galvanized zinc layers on front and back surfaces of the steel plate enhance corrosion resistance, and durability.

For reference, in formation of the steel pipe from the galvanized steel plate 1, the galvanized steel plate 1 is rolled into a helical form, with edges lock seamed, by a steel pipe former generally used in the field of a steel pipe industry, in which it can be known that if the galvanized steel plate 1 is corrugated before the rolling into the helical form by using an extra equipment, the finished steel pipe will be a corrugated steel pipe, which has a strength higher than non-corrugated steel pipe, with a longer durability.

In the meantime, currently, as demands for the steel pipe (inclusive of corrugate pipe) with better corrosion resistance, and durability formed of the galvanized steel pipe 1 is high for sewage disposal, the steel pipe is formed from polyethylene sheet 2 cladded galvanized steel plate, which is formed by putting polyethylene cladding on front and back surfaces of galvanized steel pipe, for improving the corrosion resistance, and durability.

Thus, the polyethylene clad galvanized steel plate requires putting the polyethylene cladding on front and back surfaces of the galvanized steel plate, for which on device is required. A related art process for putting polyethylene cladding on a galvanized steel plate will be explained.

In the related art, manual coating of an adhesive 3 on one surface of the galvanized steel plate 1, being unrolled from a roll, is made, and a roll of polyethylene sheet 2 is unrolled thereon, so that the polyethylene sheet 2 is pre-bonded on one surface of the galvanized steel plate 1.

Then, the galvanized steel plate 1 having the polyethylene sheet 2 pre-bonded on one surface thereof is turned over, manual coating of an adhesive on the other surface of the galvanized steel plate 1 is made, another roll of polyethylene sheet 2 is unrolled thereon, so that the polyethylene sheet 2 is pre-bonded on the other surface of the galvanized steel plate 1.

Referring to FIG 1, upon finishing the pre-bonding of the polyethylene sheets 2 on the one and the other surfaces of the galvanized steel plate 1, the polyethylene sheet 2 per-bonded galvanized steel plate 1 is passed through between compressive rollers with a plurality of rollers arranged oppositely, the pre-bonded polyethylene sheets 2 are bonded on the one surface and the other surface of the galvanized steel plate 1, with an adhesive layer formed inbetween, firmly and completely, to obtain a polyethylene clad galvanized steel plate 1, which may be used for forming a steel pipe.

In the meantime, in the process of bonding the polyethylene sheets 2 on both surfaces of the galvanized steel plate 1, the galvanized steel plate may be subjected to shot blasting for removing foreign matters from the one and the other surfaces, that improves adhesive capability of the polyethylene sheet 2 to the galvanized steel plate 1.

However, the related art process for putting polyethylene cladding on a galvanized steel plate has the following problems.

First, the putting of polyethylene cladding on a galvanized steel plate by bonding of an adhesive is liable to peel off as the bonding force between the galvanized steel plate 1 and the polyethylene sheet 2 becomes the weaker gradually as times goes by (particularly, in the case of corrugated polyethylene clad galvanized steel pipe), causing fast corrosion and short durability of the pipe.

Second, the non-automated process has a poor workability, with a low productivity and a high production cost.

Third, the poor washing of the galvanized steel plate 1 before bonding the polyethylene sheets 2 on both surfaces of the galvanized steel plate 1, such as one time of cleaning of the galvanized steel plate 1 surfaces with water, or no cleaning at all, failing to remove various impurities (particularly, organic impurities) from the both surfaces of the galvanized steel plate 1, can not, but cause peeling the polyethylene sheet 2 off the galvanized steel plate 1, that reduces the corrosion resistance, and durability. Even though, the galvanized steel plate 1 is subjected to shot blasting with steel pieces for perfect removal of the impurities in the invention of prevention of the peeling off in advance, the shot blasting results in damage to the zinc layer, that offsets the advantage of improvement of the bonding force, to some extent.

Fourth, uneven surfaces of the galvanized steel plate 1 which may be formed during initial rolling and/or unrolling for putting the polyethylene sheet 2 thereon caused by different reasons, that inevitably leads to bonding of the polyethylene sheet 2 on the uneven surfaces of the galvanized steel plate 1, with a poor bonding force, which affects bonding of adjacent parts, are liable to cause peeling of the polyethylene sheet 2 off the galvanized steel plate 1, that drops the corrosion resistance, and durability.

SUMMARY OF THE INVENTION

Accordingly, the present invention is directed to a device for putting polyethylene cladding on a galvanized steel plate that substantially obviates one or more of the problems due to limitations and disadvantages of the related art.

An object of the present invention is to provide a device for putting polyethylene cladding on a galvanized steel plate, in which putting of polyethylene cladding on both surfaces of a galvanized steel plate is automated by welding, thereby enhancing productivity by improving workability, and dropping a production cost by saving labor cost.

Another object of the present invention is to provide a device for putting a polyethylene cladding on a galvanized steel plate, in which various impurities are removed from a galvanized steel plate while giving no damage to the zinc layer before welding the polyethylene sheets on the galvanized steel plate, and uneven surfaces of the galvanized steel plate being unrolled from a roll are flattened, for preventing the polyethylene cladding from being peeled off the galvanized steel plate even if prolonged use of the steel pipe, thereby improving corrosion resistance, and durability.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for putting polyethylene cladding on a galvanized steel plate includes a base for placing different elements of the device thereon, an unroller at one end of the base for unrollably supporting a roll of galvanized steel plate, a plate press on one side of, and a distance away from the unroller on the base for pressing down unrolling galvanized steel plate to flatten uneven parts thereof, an ultrasonic cleaner on one side of, and a distance away from the plate press on the base for removing various impurities stuck to a surface of the galvanized steel plate passed through the plate press with an ultrasonic wave, a dryer on one side of, and a distance away from the ultrasonic cleaner on the base for drying moisture on the surface of the galvanized steel plate passed through the ultrasonic cleaner with high temperature dry air, an intermediate frequency heater on one side of, and a distance away from the dryer on the base for heating the galvanized steep plate passed through the dryer with an intermediate frequency wave, a sheet feeder on one side of, and a distance away from the intermediate frequency heater on the base having one pair of sheet unrollers each unrollably supporting a roll of polyethylene sheet, for bringing the polyethylene sheets unrolling from the sheet unrollers into contact with opposite sides of the galvanized steel plate, a roll press on one side of, and a distance away from the sheet feeder on the base for pressing down the polyethylene sheets in contact with opposite surfaces of the galvanized steel plate thereto, to weld thereto, a cooler on one side of, and a distance away from the roll press on the base for cooling down the galvanized steel plate having the polyethylene sheets welded on the opposite surfaces thereof, a sheet roller at the other end of the base, an opposite end of the unroller, for rolling the galvanized steel plate into a roll, a cutter between the cooler and the sheet roller on the base for cutting the galvanized steel plate as required, and a brake between the cutter and the sheet roller on the base for holding the galvanized steel plate at the moment the galvanized steel plate is cut with the cutter for preventing the galvanized steel plate rolled on the sheet roller from unrolling.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain principles of the invention.

In the drawings.

DETAILED DESCRIPTION OF THE PREFERRED EMBODIMENT

Figure 1:
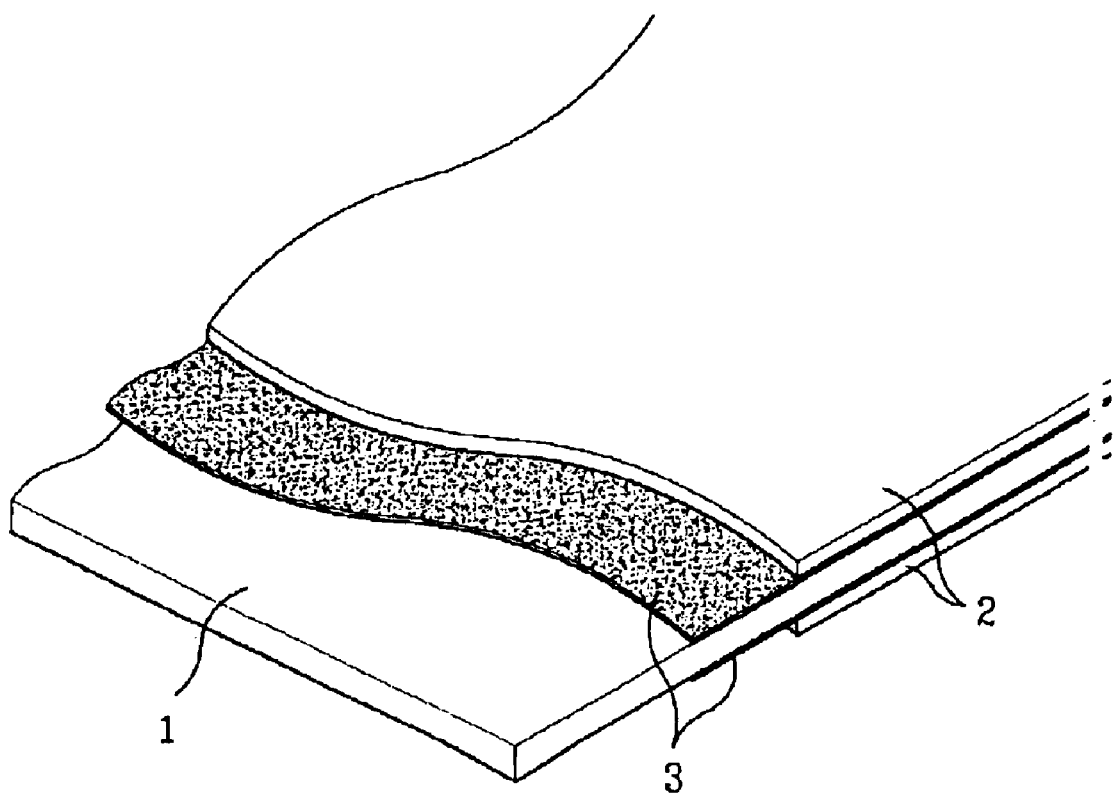
FIG. 1 illustrates a perspective view of a related art polyethylene clad galvanized steel plate, with a partial cut away view.
Figure 2:
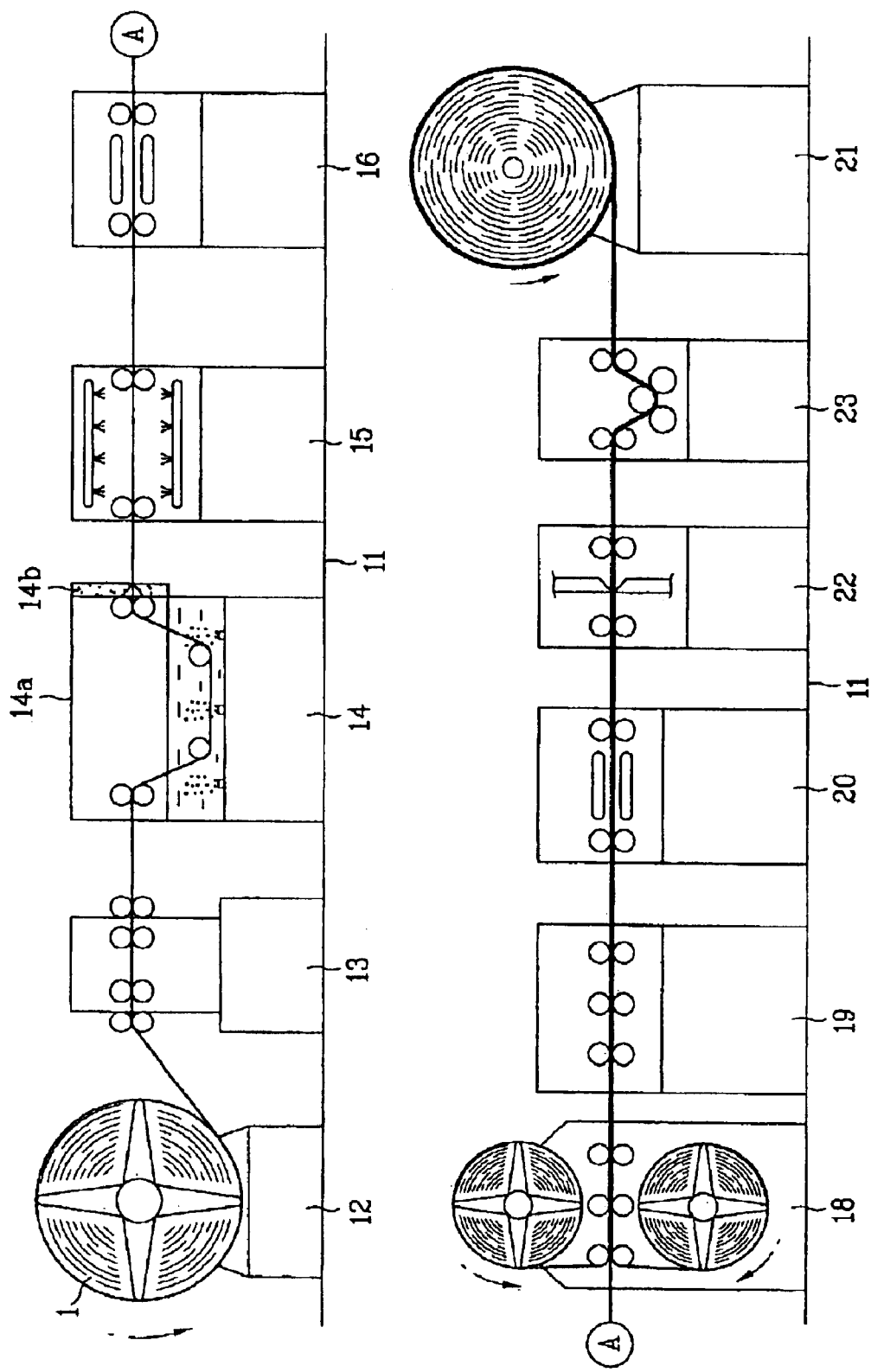
FIG. 2 illustrates a system of a device for putting polyethylene cladding on a galvanized steel plate in accordance with a preferred embodiment of the present invention, schematically.
Figure 3:
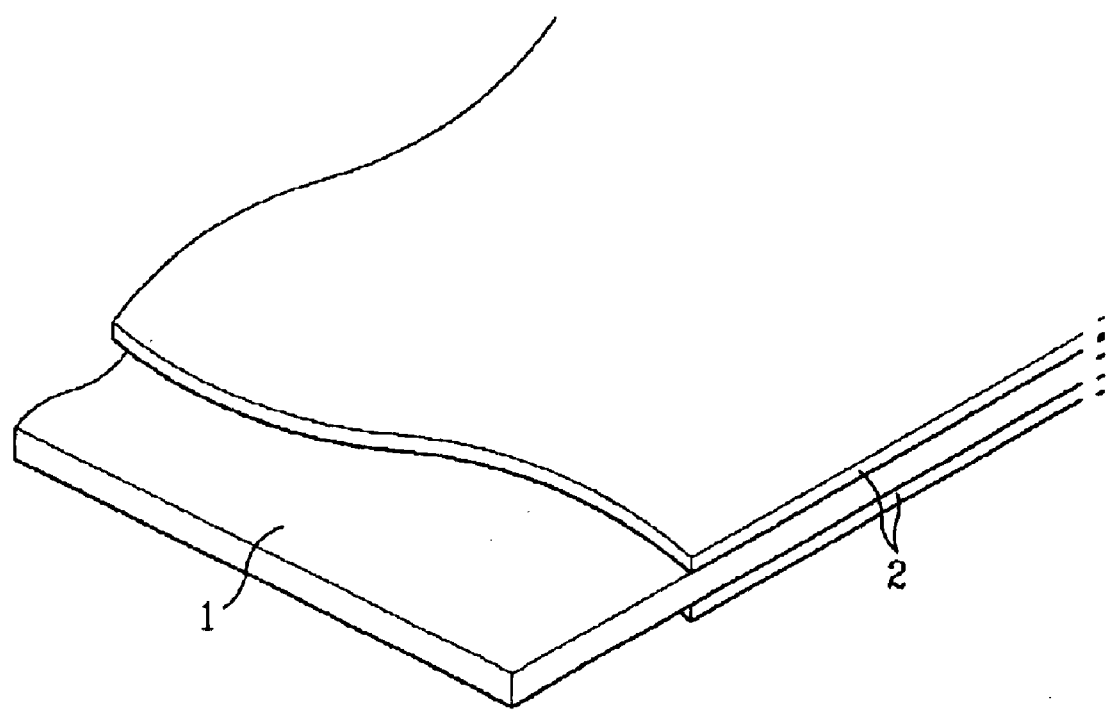
FIG. 3 illustrates a perspective view of a polyethylene clad galvanized steel plate formed by a device of the present invention, with a partial cut away view.

Reference will now be made in detail to the preferred embodiments of the present invention, examples of which are illustrated in the accompanying drawings. FIG. 2 illustrates a system of a device for putting polyethylene cladding on a galvanized steel plate in accordance with a preferred embodiment of the present invention, schematically.

Referring to FIG. 2, the device for putting polyethylene cladding on a galvanized steel plate includes a base 11 for placing different elements of the device thereon, an unroller 12 at one end of the base for unrollably supporting a roll of galvanized steel plate 1, a plate press 13 on one side of, and a distance away from the unroller 12 on the base 11 for pressing down unrolling galvanized steel plate 1 to flatten uneven parts thereof, an ultrasonic cleaner 14 on one side of, and a distance away from the plate press 13 on the base 11 for removing various impurities stuck to a surface of the galvanized steel plate 1 passed through the plate press with an ultrasonic wave, a dryer 15 on one side of, and a distance away from the ultrasonic cleaner 14 on the base 11 for drying moisture on the surface of the galvanized steel plate 1 passed through the ultrasonic cleaner with high temperature dry air, an intermediate frequency heater 16 on one side of, and a distance away from the dryer 15 on the base 11 for heating the galvanized steep plate 1 passed through the dryer with an intermediate frequency wave, a sheet feeder 18 on one side of, and a distance away from the intermediate frequency heater 16 on the base 11 having one pair of sheet unrollers 17 each unrollably supporting a roll of polyethylene sheet 2, for bringing the polyethylene sheets unrolling from the sheet unrollers into contact with opposite sides of the galvanized steel plate 1, a roll press 19 on one side of, and a distance away from the sheet feeder 18 on the base 11 for pressing down the polyethylene sheets in contact with opposite surfaces of the galvanized steel plate thereto, to weld thereto, a cooler 20 on one side of, and a distance away from the roll press 19 on the base 11 for cooling down the galvanized steel plate 1 having the polyethylene sheets 2 welded on the opposite surfaces thereof, a sheet roller 21 at the other end of the base 11, an opposite end of the unroller 12 for rolling the galvanized steel plate 1 into a roll, a cutter 22 between the cooler 20 and the sheet roller 21 on the base 11 for cutting the galvanized steel plate 1 as required, and a clamper 23 between the cutter 22 and the sheet roller 21 on the base 11 for holding the galvanized steel plate 1 at the moment the galvanized steel plate 1 is cut by the cutter 22 for preventing the galvanized steel plate 1 rolled on the sheet roller 21 from unrolling.

Each of the elements of the device on the base 1 includes a plurality of rollers except the roller 12 and the sheet roller 21 for transfer, or guiding a path of the galvanized steel plate 1.

In the meantime, it is preferable that the rollers in the roll press 19, which press down the polyethylene sheets 2 onto the galvanized steel plate 1 for welding the polyethylene sheets 2 thereto, is formed of a silicone that is elastic and has a good heat resistance, for uniform application of a pressure to the polyethylene sheets 2 even if the surfaces of the galvanized steel plate are not smooth, thereby welding the polyethylene sheets 2 on the galvanized steel plate 1 firmly regardless of a surface condition of the galvanized steel plate 1.

The ultrasonic cleaner 14 supplies an ultrasonic wave to pure water in a water tank 14a, and has a part of the galvanized steel plate submerged in the pure water, for removing foreign matters stuck to the surfaces of the galvanized steel plate. There is a brush 14b at an outlet of the ultrasonic cleaner 14 for wiping out large drops of water on the surfaces of the galvanized steel plate 1 adhered in the process of ultrasonic cleaning of the galvanized steel plate 1.

The operation of the device for putting polyethylene cladding on a galvanized steel plate of the present invention will be explained.

Before welding the polyethylene sheets 2 to the opposite surfaces of the galvanized steel plate 1, a roll of galvanized steel plate 1 is unrollably supported on the unroller 12 at one end of the base 11, and a fore end of the galvanized steel plate 1 is passed through the plate press 13→the ultrasonic cleaner 14→the dryer 15→the intermediate frequency heater 16→the sheet feeder 18→the roll press 19→the cooler 20→the cutter 22→the clamper 23, and fixes to a roller in the sheet roller 21 at the other end of the base 11, and, rolls of the polyethylene sheets 2 are unrollably loaded on the sheet unrollers 17 in the sheet feeder 18, and fore ends of the polyethylene sheets 2 are passed through the sheet unrollers 17 and the roll press 19, with the galvanized steel plate 1 between the polyethylene sheets 2.

Upon putting the device of the present invention into operation, the roll of galvanized steel plate 1 loaded on the unroller 12 keeps unrolled, and moved away from the unroller 12, when the rolls of the polyethylene sheets 2 unrolling from the sheet unroller 17 loaded on the sheet feeder 18 are brought into contact with, and welded to the opposite surfaces of galvanized steel plate 1, and rolled at the sheet roller 21.

In more detail, the galvanized steel plate 1 unrolling from the unroller 12 has entire surfaces thereof to become smooth even if there are uneven parts in the galvanized steel plate 1 galvanized steel plate 1 is subjected to application of a strong pressure from opposite directions when the galvanized steel plate 1 is passed through the plate press 13.

Then, the galvanized steel plate 1 is passed through the water in the water tank 14a of the ultrasonic cleaner 14, into which an ultrasonic wave is provided. Accordingly, various impurities stuck to the surfaces of the galvanized steel plate 1 is removed by the ultrasonic wave, to leave clean surfaces of the galvanized steel plate 1, such that no impurities stuck to the surfaces of the galvanized steel plate affect the welding of the polyethylene sheets 2 of the galvanized steel plate 1 in a following process.

In the meantime, the galvanized steel plate 1 passed through the water in the water tank 14a exits through the outlet of the ultrasonic cleaner 14, when the brush 14b fitted thereto brushes away large drops of water from the galvanized steel plate 1, to accelerate the drying at the dryer 15 in the next process.

Then, the galvanized steel plate 1 enters into the dryer 15, into which high temperature dry air is supplied, such that the moisture on the surfaces of the galvanized steel plate 1 is dried fully. The galvanized steel plate 1 is passed through the intermediate frequency heater 16, where the galvanized steel plate 1 is heated to a temperature ranging 120~150° C. Then, the galvanized steel plate 1 is passed through the sheet feeder 18.

The galvanized steel plate 1 is dried at the dryer 15 fully, for prevention of substantial drop of bonding force caused by the moisture on the galvanized steel plate 1, and the galvanized steel plate 1 is heated at the intermediate frequency heater 16 with an intermediate frequency wave, because, different from the high frequency wave, the intermediate frequency wave heats a heating object, the galvanized steel plate 1, starting from an inner side of the object to an outer side thereof, to heat the galvanized steel plate 1 uniformly regardless of a flatness, that facilitates a smooth welding of the polyethylene sheets 2 on the opposite surfaces of the galvanized steel plate 1, later.

If, not the intermediate frequency heater 16, but other heating means, such as the high frequency heater, is employed in the heating of the galvanized steel plate 1, since the high frequency heater, or the like, heats the galvanized steel plate, an heating object, starting from an outer side to an inner side, if an entire surface of the galvanized steel plate 1 is not flat (i.e., when one part is depressed, or inflated), the galvanized steel plate 1 can not be heated uniformly due to difference of heat transfer distances, to result in poor welding at a lower temperature region.

When the galvanized steel plate 1 heated to 120~150° C. is passed through the sheet feeder 18, the polyethylene sheets 2 are brought into contact with the opposite surfaces of the galvanized steel plate 1 as the polyethylene sheets 2 unroll from the sheet unrollers 17, starting from which the polyethylene sheets 2 melt at contact surfaces to the galvanized steel plate 1. Then, the galvanized steel plate 1 having the polyethylene sheets 2 in contact with the opposite surfaces thereof are pressed in opposite directions at the roll press 19, to put the polyethylene cladding on the galvanized steel plate 1 as the polyethylene sheets 2 are welded to the galvanized steel plate 1.

The galvanized steel plate 1 having the polyethylene sheets 2 welded thereto is passed through the cooler 20, to set the welding of the polyethylene sheets 2 on the galvanized steel plate 1, and then, passed through the cutter 22 and the clamper 23 in succession, and rolled onto the sheet roller 21 at the other end of the base 11 opposite to the unroller 12. In this instance, the galvanized steel plate 1 having the polyethylene sheets 2 welded thereto is not rolled on the sheet roller 21, not directly, but passed through the cutter 22 beforehand, for cutting the polyethylene clad galvanized steel plate at a desired length (in general, the polyethylene clad galvanized steel plate is cut to use in plates). The polyethylene clad galvanized steel plate is passed through the clamper 23 for preventing unintended unrolling of the polyethylene clad galvanized steel plate rolled on the sheet roller 21 at the moment the polyethylene clad galvanized steel plate is cut with the cutter 22 by holding the polyethylene clad galvanized steel plate.

Each of the elements of the device on the base 1 includes a plurality of rollers except the unroller 12 and the sheet roller 21, for transfer, or guiding a path of the galvanized steel plate 1, inclusive of the polyethylene clad galvanized steel plate. It is preferable that the rollers in the roll press 19, which press down the polyethylene sheets 2 onto the galvanized steel plate 1 for welding the polyethylene sheets 2 thereto, is formed of a silicone that is more elastic than a generally used metal roller and has a good heat resistance, for uniform application of a pressure to the polyethylene sheets 2 even if the surfaces of the galvanized steel plate are not smooth, thereby welding the polyethylene sheets 2 on the galvanized steel plate 1 firmly regardless of a surface condition of the galvanized steel plate 1.

As has been explained, the device for putting polyethylene cladding on a galvanized steel plate has the following advantages.

First, the putting polyethylene cladding on a galvanized steel plate by welding permits to improve corrosion resistance, and durability of the galvanized steel plate 1 as the polyethylene sheet 2 is not peeled off the galvanized steel plate 1 easily in the process of forming a steel pipe, or using the pipe for a long time period.

Second, the automated process permits improvement in workability that increases productivity, and drop of cost as a labor cost is saved.

Third, the cleaning of opposite surfaces of the galvanized steel plate with an ultrasonic wave before welding the polyethylene sheets 2 onto the galvanized steel plate permits to improve corrosion resistance, and durability of the polyethylene clad galvanized steel plate 1 because various impurities stuck to the opposite surfaces of the galvanized steel sheet 1 (particularly, organic impurities) are removed perfectly, to prevent deterioration of bonding force of the polyethylene cladding to the galvanized steel plate.

Since uneven parts of the galvanized steel plate are flattened substantially as the galvanized steel plate passes through the plate press even if the uneven parts are formed owing to various causes during the galvanized steel plate 1 is rolled initially, and/or unrolled for putting into contact with the polyethylene sheets 2, preventing deterioration of the bonding force of the polyethylene sheets to the galvanized steel plate, the polyethylene clad galvanized steel plate has improved corrosion resistance, and durability.

It will be apparent to those skilled in the art that various modifications and variations can be made in the device for putting polyethylene cladding on a galvanized steel plate of the present invention without departing from the spirit or scope of the invention. Thus, it is intended that the present invention cover the modifications and variations of this invention provided they come within the scope of the appended claims and their equivalents.

What is claimed is:

1. A device for putting polyethylene cladding on a galvanized steel plate comprising:
    a base for placing different elements of the device thereon;
    an unroller at one end of the base for unrollably supporting a roll of galvanized steel plate;
    a plate press on one side of, and a distance away from the unroller on the base for pressing down unrolling galvanized steel plate to flatten uneven parts thereof;
    an ultrasonic cleaner on one side of, and a distance away from the plate press on the base for removing various impurities stuck to a surface of the galvanized steel plate passed through the plate press with an ultrasonic wave;
    a dryer on one side of, and a distance away from the ultrasonic cleaner on the base for drying moisture on the surface of the galvanized steel plate passed through the ultrasonic cleaner with high temperature dry air;
    an intermediate frequency heater on one side of, and a distance away from the dryer on the base for heating the galvanized steel plate passed through the dryer with an intermediate frequency wave;
    a sheet feeder on one side of, and a distance away from the intermediate frequency heater on the base having one pair of sheet unrollers each unrollably supporting a roll of polyethylene sheet, for bringing the polyethylene sheets unrolling from the sheet unrollers into contact with opposite sides of the galvanized steel plate;
    a roll press on one side of, and a distance away from the sheet feeder on the base for pressing down the polyethylene sheets in contact with opposite surfaces of the galvanized steel plate thereto, to weld thereto;
    a cooler on one side of, and a distance away from the roll press on the base for cooling down the galvanized steel plate having the polyethylene sheets welded on the opposite surfaces thereof;
    a sheet roller at the other end of the base, an opposite end of the unroller, for rolling the galvanized steel plate into a roll;
    a cutter between the cooler and the sheet roller on the base for cutting the galvanized steel plate as required; and
    a brake between the cutter and the sheet roller on the base for holding the galvanized steel plate at the moment the galvanized steel plate is cut with the cutter for preventing the galvanized steel plate rolled on the sheet roller from unrolling.

2. A device as claimed in claim 1, further comprising a brush fitted to an outlet of the ultrasonic cleaner for wiping out large drops of water on the surfaces of the galvanized steel plate adhered in the process of ultrasonic cleaning of the galvanized steel plate.

3. A device as claimed in claim 1, wherein the roll press includes rollers formed of silicone having good elasticity and heat resistance for pressing down the polyethylene sheets onto the galvanized steel plate.

* * * * *

UNITED STATES PATENT AND TRADEMARK OFFICE
CERTIFICATE OF CORRECTION

PATENT NO.    : 6,785,949 B2
DATED         : September 7, 2004
INVENTOR(S)   : Han Gon Kim It is certified that error appears in the above-identified patent and that said Letters Patent is hereby corrected as shown below:

Title page,
Item [57], ABSTRACT, please insert,

-- Device for putting polyethylene cladding on a galvanized steel plate, wherein a galvanized steel plate unrolling from unroller is passed through a plate press, an ultrasonic cleaner, a dryer, an intermediate frequency heater, and a roll press in succession, and polyethylene sheets unrolling from one pair of sheet unrollers are welded on opposite sides of the galvanized steel plate, and rolled on a sheet roller, thereby automatically putting polyethylene cladding on the galvanized steel plate, to improve workability and productivity. --

Signed and Sealed this

Fifteenth Day of March, 2005

JON W. DUDAS
*Director of the United States Patent and Trademark Office*